Feb. 25, 1936.      C. A. NELSON      2,032,145
FLUID PRESSURE BRAKE
Filed March 12, 1932
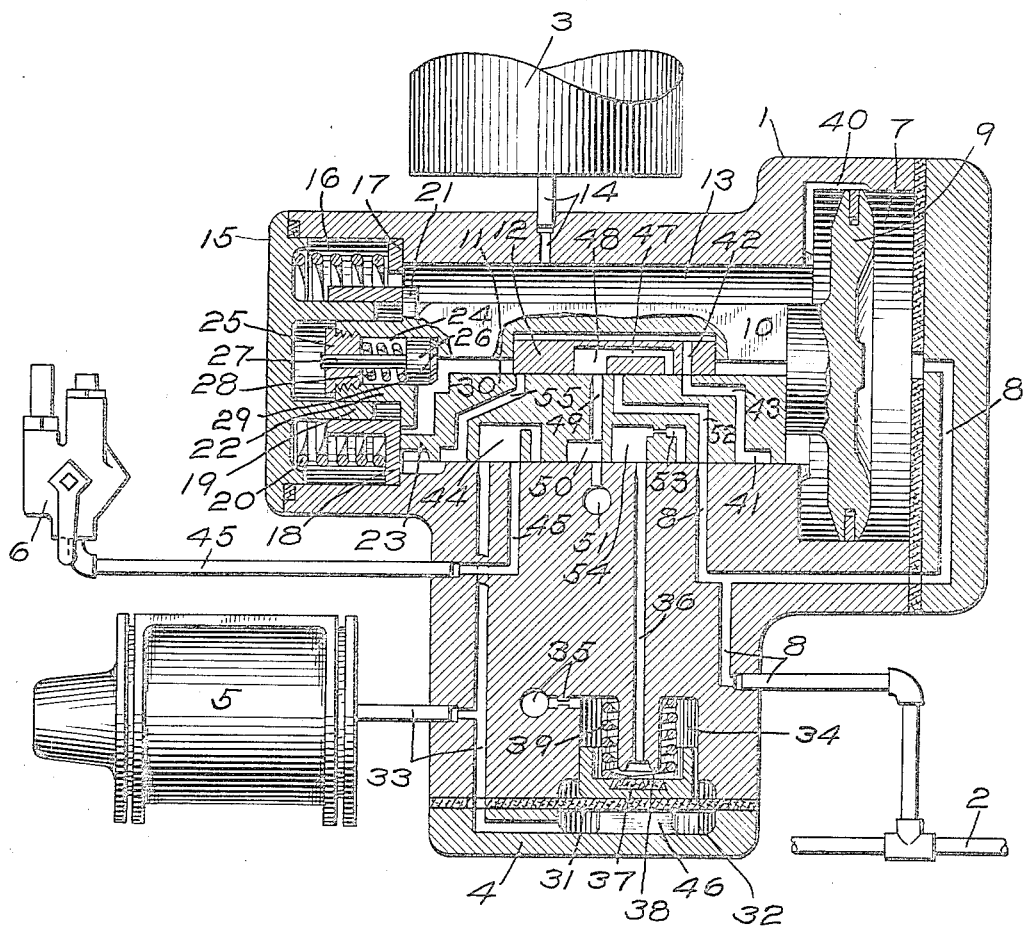
INVENTOR.
CLAUDE A. NELSON
By Wm. M. Cady
ATTORNEY.

Patented Feb. 25, 1936

2,032,145

UNITED STATES PATENT OFFICE 2,032,145

FLUID PRESSURE BRAKE

Claude A. Nelson, Wilmerding, Pa., assignor to The Westinghouse Air Brake Company, Wilmerding, Pa., a corporation of Pennsylvania Application March 12, 1932, Serial No. 598,333

19 Claims. (Cl. 303—83)

This invention relates to fluid pressure brake equipment which operates according to variations in brake pipe pressure to control the application and release of the brakes, and relates more particularly to the manner of loading and unloading of a main slide valve of a brake controlling valve device such as the triple valve device of the equipment.

As shown in Ellis E. Hewitt's application, Serial No. 545,647, filed June 20, 1931, it has heretofore been proposed to provide a loading cavity in the seat of the main slide valve of a triple valve device, which acts, when subjected to atmospheric pressure to load the valve, so that frictional resistance of the valve to movement is increased in the well known manner.

In the above identified Hewitt application, the loading cavity in question is connected in release position to the atmosphere through a port in the main slide valve, which is in full registration with a passage leading from the seat of the valve to the atmosphere so that the loading cavity is effective to load the valve, but in service position and as the valve is moved from service position toward release position, the cavity is supplied with fluid under pressure, so that the cavity is not then effective to load the valve and increase the frictional resistance of the valve to movement.

When the main slide valve is in full release position, two quick service ports therein are in full registration with two quick service passages in the triple valve casing, one of said passages leading from the brake pipe to the slide valve seat and the other leading from said seat to a quick service bulb. In the full release position of the triple valve device, the auxiliary slide valve closes communication between the quick service ports in the main slide valve, and when a brake pipe reduction is initiated to effect an application of the brakes a cavity in the auxiliary slide valve establishes communication between these ports to effect an initial local reduction in brake pipe pressure. On the cars of the train, where in releasing the brakes, the increase in brake pipe pressure is at a rapid rate, sufficient fluid pressure differential will be created on the triple valve piston to cause it to shift the main slide valve to either full or retarded release position, but on the cars where the increase in brake pipe pressure is at a slow rate, the main slide valve may not be moved to full release position but may come to a stop just as soon as the resistance of the slide valve to further movement is increased by the loading of the valve upon the venting of fluid under pressure from the loading cavity to the atmosphere, through the cracked or partially open communication from the cavity to the atmosphere. Further, just after this communication is cracked open, the triple valve piston cracks the usual feed groove open, so that fluid under pressure flows through the feed groove to the valve chamber and auxiliary reservoir. This tends to destroy the differential created on the piston and, therefore, the tendency of the main slide valve to remain in the undesired release position just described is aggravated. If, when the triple valve parts have come to a stop short of full service position as just described, a reduction in brake pipe pressure is effected to initiate an application of the brakes, the partially open quick service communications will retard the rate of the local flow of fluid from the brake pipe, and consequently the desired initial quick service activity will not be obtained, which is of course objectionable.

As shown in the above referred to application, it has been further proposed to supply fluid under pressure from the triple valve piston chamber to the loading cavity above referred to when the main slide valve is moved to retarded release position to render the loading cavity ineffective to load the valve. When the pressures on opposite sides of the triple valve piston become substantially equal the retarded release spring acts to shift the slide valve toward full release position, and as the atmospheric communication from the loading cavity is cracked open, fluid under pressure is vented from the cavity effecting the loading of the valve, so that the frictional resistance of the valve to further movement toward full release position is increased. This has the tendency of bringing the slide valve to a stop before it reaches full release position. At substantially the same time as the above mentioned communication is cracked open, the communications between the quick service ports in the main slide valve and quick service passages in the triple valve casing are cracked open, so that if the slide valve has come to a stop short of full service position, the desired initial quick service activity cannot be obtained, since the cracked open quick service communications act to retard the rate of the local flow of fluid from the brake pipe.

As shown in the Hewitt application before referred to, it has heretofore been proposed to employ a stabilizing spring and plunger mechanism, which is adapted to prevent the triple valve piston and auxiliary slide valve from unintentionally moving from release position to initial quick service position upon slight fluctuations in brake pipe pressure, and which acts to assist in starting the movement of the piston and auxiliary slide valve toward service lap position. With the several parts of the triple valve device in service position and the loading cavity in the main valve rendered ineffective to load the valve, the stabilizing spring and plunger mechanism in cooperative engagement with the piston stem and the main slide valve may in some cases accidentally move the main valve outwardly beyond its service position, which of course is objectionable.

The principal object of my invention is to provide a triple valve device with means, whereby the frictional resistance of the main slide valve of the device to movement is so controlled as to eliminate the above mentioned objectionable features.

According to this object, I provide the main valve of the triple valve device with a loading cavity which, with the valve in release position, is supplied with fluid under pressure so that the cavity is ineffective to load the valve and which, in effecting an application of the brakes, as the valve is moved toward service position, is open to the atmosphere during the travel of the valve from the initial quick service position to service position, and which is maintained open to the atmosphere as long as the triple valve piston remains in service position, thus loading the valve so that its frictional resistance is increased sufficiently that the action of the stabilizing spring and plunger mechanism is not liable to cause the valve to move forwardly relative to the triple valve piston and auxiliary slide valve. The loading cavity is again supplied with fluid under pressure when the piston acts to move the auxiliary slide valve rearwardly to service lap position, so that the main valve is now unloaded. During the travel of the triple valve parts from service lap position to full release or retarded release position, or from retarded release position to full release position, fluid under pressure is supplied to the loading cavity, consequently the valve is unloaded during its release movements.

Another object of my invention is to provide improved means for limiting the local quick service reduction in brake pipe pressure according to a predetermined increase in brake cylinder pressure.

Other objects and advantages of my invention will appear in the following more detailed description.

In the accompanying drawing, the single figure is a diagrammatic view, mainly in section, of a fluid pressure brake equipment embodying my invention.

The fluid pressure brake equipment may be of the type shown in the before mentioned Hewitt application, but for simplification, is shown in the accompanying drawing as comprising a triple valve device 1, a brake pipe 2, an auxiliary reservoir 3, a quick service modifying valve device 4, a brake cylinder 5, and a brake cylinder pressure retaining valve device 6.

The triple valve device 1 may comprise a casing having a piston chamber 7 communicating with the brake pipe 2 through a passage and pipe 8 and containing a piston 9 having a stem 10, adapted to operate a main slide valve 11 and an auxiliary slide valve 12, contained in a valve chamber 13 communicating with the auxiliary reservoir 3 through a passage and pipe 14.

The valve chamber 13, at the left hand end of the casing, is closed by a cap 15 and as indicated by the reference character 16 is of enlarged diameter, so as to form an annular stop shoulder 17 within the chamber. This stop shoulder is adapted to limit the forward movement of a movable restarded release member 18, which is in slidable engagement with the outer surface of an annular guide lug 19 carried by the cap 15. Interposed between and engaging the cap 15 and retarded release member 18, is a retarded release spring 20, which at all times tends to urge the member 18 toward the stop shoulder 17.

The rear end portion of the piston stem 10 is provided with a collar 21 and is also provided with a guide portion 22 which extends rearwardly of the collar, said guide portion being in slidable engagement with the interior surface of the guide lug 19 carried by the cap 15. One face of the collar 21 is adapted to engage the main slide valve 11 for moving said valve, and the opposite face is adapted to engage the retarded release member 18. The main slide valve 11 is provided with a rearwardly extending finger 23 which is adapted to be in engagement with the member 18 when the collar is in engagement with the member.

The guide portion 22 of the piston stem is provided with a central bore 24, the left hand end of which is closed by a screw plug 25. Contained in the bore 24 is a plunger 26 having a stem 27 which extends through a central bore in the screw plug 25, the stem being slidably guided within the bore. Contained in the bore 24 is a coil spring 28, which is interposed between and engages the plug 25 and the rear face of the plunger 26. This spring acts to normally maintain a portion of the front face of the plunger in engagement with a shoulder 29 formed on the underside of the piston stem a short distance to the right of the collar 21. The portion of the front face of the plunger which is not in engagement with the shoulder 29 is adapted to engage a rear face 30 of the main slide valve 11.

The quick service modifying valve device 4 comprises a casing which, as shown in the drawing, may be a part of the triple valve casing and also comprises a flexible diaphragm 31 which is mounted in the casing. At one side of the diaphragm there is a chamber 32, which is constantly connected with the brake cylinder 5 through a brake cylinder passage and pipe 33, and at the other side of the diaphragm there is a chamber 34, which is constantly open to the atmosphere through a restricted passage 35 and is normally open to a quick service passage 36 leading from the seat of the main slide valve 11 of the triple valve device. A valve 37 is contained in the chamber 34, which is adapted to be shifted by the diaphragm to seat on a seat rib 38 to close the communication from the passage 36 to the chamber 34 and which, at all times, is urged toward its unseated position by the action of a coil spring 39 contained in the chamber 34.

The brake cylinder pressure retaining valve device 6 may be of the usual construction, and since this construction is well known in the art, a detailed description here is deemed unnecessary.

In operation, to initially charge the equipment, fluid under pressure is supplied to the brake pipe 2 in the usual manner and flows therefrom to the triple valve piston chamber 7 by way of pipe and passage 8.

With the several parts of the triple valve device in full release position as shown in the drawing, fluid under pressure supplied to the triple valve piston chamber 7 flows through feed groove 40 to valve chamber 13 and from thence to the auxiliary reservoir through passage 14.

Fluid under pressure thus supplied to the valve chamber 13 flows to a frictional resistance controlling or loading cavity 41 in the face of the main slide valve 11 by way of registering ports 42 and 43 in the auxiliary and main slide valves 12 and 11 respectively. It will here be noted that fluid under pressure is supplied to the cavity 41, so that the cavity is now ineffective to load the valve.

Further, with the triple valve parts in full release position, the brake cylinder 5 and the diaphragm chamber 32 in the valve device 4 are open to the atmosphere by way of passage 33, a cavity 44 in the main slide valve 11, a passage and pipe 45 and retaining valve device 6, which device is shown in the position to permit the complete discharge of fluid under pressure from the brake cylinder in releasing the brakes. With the chamber 32 in the valve device 4 thus connected to the atmosphere, the spring 39 acts to maintain the valve 37 unseated as shown, there being a stop 46 provided, which, through the medium of the diaphragm 31, limits the unseating movement of the valve.

To effect an application of the brakes, a gradual reduction in brake pipe pressure is made in the usual manner, which results in a corresponding reduction in the pressure of fluid in the triple valve piston chamber 7.

Upon a predetermined light reduction in the pressure of fluid in the triple valve piston chamber 7, fluid under pressure in the slide valve chamber 13 shifts the triple valve piston 9 and auxiliary slide valve 12 toward the right hand. In thus moving, the piston 9 closes the feed groove 40 so as to prevent back flow of fluid from the valve chamber 13 to the piston chamber 7, after which the continued movement of the piston causes the plunger 26 to engage the rear end of the main slide valve so that further movement of the piston and auxiliary slide valve toward the right is now yieldably resisted by the action of the plunger 26 and spring 28. As the piston continues to move toward the right, the spring 28 is compressed until such time as the collar 21 engages the rear end of the main slide valve, when the compressing of the spring ceases and the collar causes the main slide valve to move toward the right hand.

Upon the initial movement of the auxiliary slide valve 12 relative to the main slide valve toward application position, the port 42 in the auxiliary slide valve is moved out of registration with the port 43 in the main slide valve, so that fluid under pressure is no longer supplied to the control cavity 41.

At substantially the same time as the plunger 26 engages the rear end of the main slide valve 11, communication between the ports 43 and 47 in the main and auxiliary slide valves respectively, is cracked open, so that fluid under pressure which is bottled up in the loading cavity 41 is discharged to the atmosphere by way of cavity 48 in the auxiliary slide valve, port 49 and cavity 50 in the main slide valve and passage 51, thus loading the main slide valve. At substantially the same time as the loading of the main slide valve is effected, the initial quick service port 52 in the main slide valve is cracked open to the cavity 48 in the auxiliary slide valve, which is open to the atmosphere through the port 49 and cavity 50 in the main slide valve and passage 51. As the auxiliary slide valve continues to move, the above mentioned communications are fully opened, movement of the valve being yieldably resisted by the action of the spring 28 and plunger 26. With the auxiliary slide valve in quick service position, fluid under pressure is locally vented from the brake pipe to the atmosphere by way of pipe and passage 8, port 52 in the main slide valve, cavity 48 in the auxiliary slide valve, port 49 and cavity 50 in the main slide valve and passage 51, which produces a local quick service reduction in brake pipe pressure to hasten the operation of the local triple valve device and the triple valve device on the next car in a train to application position. Since each triple valve device will operate in substantially the same manner, a quick serial response to the brake pipe reduction is transmitted from car to car throughout the length of the train. It will here be understood that since the loading of the main slide valve is accomplished before it is operatively engaged by the plunger 26, the action of the spring 28, as it is being compressed, will not accidentally move the valve forwardly from the position in which it is shown in the drawing.

Now as the main slide valve 11 and auxiliary slide valve 12 are moved in unison toward application position, the communication between the brake pipe passage 8 and the quick service port 52 in the main slide valve is closed, and a restricted port 53 in the main slide valve is brought into registration with the brake pipe passage 8. The port 53 opens into a cavity 54 in the main slide valve, which is in open communication with the passage 36 so that fluid under pressure is now locally vented from the brake pipe to the atmosphere by way of pipe and passage 8, restricted port 53, cavity 54, passage 36, past the unseated valve 37 of the valve device 4, valve chamber 34 and restricted passage 35.

With the main slide valve 11 in application position, the service port 55 therein, which has been previously uncovered by the auxiliary slide valve, is in registration with the brake cylinder passage 33, so that fluid under pressure is now supplied from the auxiliary reservoir to the brake cylinder 5 and diaphragm chamber 32 in the valve device 4 by way of pipe and passage 14, slide valve chamber 13, service port 55 and passage and pipe 33 and an application of the brakes is effected.

When the brake cylinder pressure has been increased to a predetermined degree, say for instance to ten pounds, fluid at brake cylinder pressure in chamber 32 in the valve device 4 causes the diaphragm to flex and seat the valve 37 on the seat rib 38, thus closing off the further local flow of fluid from the brake pipe to the atmosphere.

It will be understood that the final local quick service venting of fluid from the brake pipe is for the purpose of preventing the triple valve piston from prematurely moving from service position to lap position, and that the venting at a slow rate is for the purpose of dampening surges which may have been caused in the fluid under pressure in the brake pipe, which surges, if they were not dampened, might cause the triple valve piston to unintentionally move from application toward release position.

The passage 35 is restricted to prevent the rapid loss of brake cylinder pressure in the event of the rupture of the diaphragm 31.

It will be noted that the loading cavity 41 in the main slide valve remains connected to the atmosphere while the triple valve parts are in service position so as to maintain the frictional resistance of the slide valve great enough to prevent the compressed spring 28 from acting to move the slide valve forwardly out of its application position.

When, in effecting an application of the brakes, the pressure of fluid in the triple valve chamber 13 is reduced slightly below the pressure of fluid in the piston chamber 7, the triple valve piston 9 and auxiliary slide valve will be moved inwardly relative to the main slide valve to lap position in which the auxiliary slide valve laps the service port 55 and thus closes off the further flow of fluid to the brake cylinder. The piston 9 is brought to a stop in lap position upon its engagement with the front end of the stationary main slide valve 11.

With the auxiliary slide valve 12 in lap position, the port 42 in the auxiliary slide valve 12 is again in registration with the port 43 in the main slide valve, so that the control cavity 41 in the main slide valve is again supplied with fluid under pressure from the valve chamber 13, and as a consequence the valve is unloaded. Before the port 42 is brought into registration with the port 43, the plunger 26, carried by the rear end of the piston stem, will be moved out of engagement with the rear end of the main slide valve, so that the main slide valve will be entirely relieved of the pressure of the spring 28 prior to the unloading of the slide valve.

To release the brakes fluid under pressure is again supplied to the brake pipe in the usual manner. On the cars where the increase in brake pipe pressure is rapid the triple valve piston and slide valves may move to retarded release position, the collar 21 on the piston stem and the finger 23 on the main slide valve 11 engaging and moving the retarded release member 18 against the resistance offered by the retarded release spring 20. On the cars where the increase in brake pipe pressure is less rapid, the triple valve piston and slide valves will move to full release position and will be brought to a stop in said position when the collar 21 on the piston stem and the finger 23 of the main slide valve abut the retarded release member 18. It will here be noted that the connection from the valve chamber 13 to the cavity 41 is maintained open while the triple valve parts are moved to or are in either retarded or full release position, so that the loading cavity is maintained ineffective to load the valve.

With the triple valve device in retarded release position, fluid under pressure is released from the brake cylinder 5 by way of pipe and passage 33, cavity 44 in the main slide valve 11, a restricted port 56 and a cavity 57 in the main slide valve, passage and pipe 45 and retaining valve device 6. With the triple valve device in full release position, fluid under pressure is released from the brake cylinder through pipe and passage 33, cavity 44 in the main slide valve, passage and pipe 45 and retaining valve device 6.

When, with the triple valve device in retarded release position, the pressure of fluid in the valve chamber 13 becomes substantially equal to the pressure of fluid in the piston chamber 7, the retarded release spring acts, through the medium of the retarded release member 18, to move the piston, auxiliary slide valve 12 and main slide valve 11 in unison to full release position, the communication from the valve chamber 13 to the cavity 41 in the main slide valve being maintained open.

It will be understood from the foregoing description that the main slide valve 11 of the triple valve device is loaded in service position, unloaded when the auxiliary slide valve 12 is moved to lap position, unloaded from lap to full release or retarded release position, and unloaded from retarded release position to full release position. Since, in releasing the brakes, the main slide valve is unloaded from lap to full or retarded release position and from retarded release to full release position, the possibility of the triple valve parts being brought to a stop before the quick service ports in the main slide valve are in full registration with the quick service passages in the casing is eliminated, consequently the desired quick service action is insured.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, of a brake controlling valve device comprising a main valve having a loading cavity normally supplied with fluid under pressure, a piston operated upon a reduction in brake pipe pressure for actuating said main valve, and means operating in advance of the movement of the main valve by said piston for venting fluid under pressure from the brake pipe and for establishing a communication through which fluid under pressure is vented from the loading cavity to effect the loading of the main valve.

2. In a fluid pressure brake, the combination with a brake pipe, of a brake controlling valve device comprising a main valve having a loading cavity normally supplied with fluid under pressure, and also comprising an auxiliary valve having a movement relative to the main valve, a piston operated upon a reduction in brake pipe pressure for operating said valves to effect an application of the brakes, means operative upon the initial movement of the auxiliary valve relative to the main valve for cracking open a communication through which fluid under pressure is vented from the brake pipe and for cracking open another communication through which fluid under pressure is vented from said loading cavity to effect the loading of the main valve, and means operative after said communications are cracked open for yieldably opposing further movement of the auxiliary valve relative to the main valve.

3. In a fluid pressure brake, the combination with a brake pipe, of a brake controlling valve device comprising a main valve having a loading cavity normally supplied with fluid under pressure, a piston operated upon a reduction in brake pipe pressure for actuating said main valve, and means operating in advance of the movement of the main valve by said piston for venting fluid under pressure from the brake pipe and for establishing a communication through which fluid under pressure is vented from the loading cavity to effect the loading of the main valve and for maintaining the loading cavity vented while the main valve is being shifted to brake applying position and while the piston and main valve are in brake applying position.

4. A triple valve device comprising a piston, a main valve operated by said piston and having a normal release position and an inner release position, said valve having a loading cavity, which when connected to the atmosphere is adapted to effect the loading of the valve and which when supplied with fluid under pressure is adapted to maintain the valve unloaded, and means establishing a communication through which fluid under pressure is supplied to said loading cavity when the main valve is in either the normal release position or the inner release position.

5. A triple valve device comprising a piston, a main valve operated by said piston and having a normal release position and an inner release position, yielding resistance means for opposing movement of said valve from the normal release position to the inner release position, said valve having a loading cavity which when vented effects the loading of the valve and which when supplied with fluid under pressure is adapted to maintain the valve unloaded, and means establishing a communication through which fluid under pressure is supplied to said loading cavity, said communication being maintained while the valve is moving from the normal release position to the inner position and while the valve is moved from the inner release position to the normal release position by said yielding resistance means.

6. A triple valve device comprising a piston, a main valve operable by said piston, an auxiliary valve operable by said piston and having a movement relative to the main valve, said valves having a brake applying position to which they are shifted by said piston upon a reduction in brake pipe pressure, and said auxiliary valve being movable by said piston relative to the main valve from brake applying position to application lap position, and means operative in the lap position of the auxiliary valve for reducing the frictional resistance offered by the main slide valve to movement toward a brake releasing position.

7. A triple valve device comprising a piston, a main valve operable by said piston and having a loading cavity which when vented effects the loading of the valve and when supplied with fluid under pressure effects the unloading of the valve, an auxiliary valve having a movement relative to the main valve, said valves having a brake applying position to which they are shifted by said piston upon a reduction in brake pipe pressure and said auxiliary valve being movable by said piston relative to the main valve from brake applying position to application lap position, a communication through which said loading cavity is vented in the brake applying position and which is closed upon movement of the auxiliary valve toward lap position, and a communication through which fluid under pressure is supplied to said cavity in the lap position of the auxiliary valve.

8. In a fluid pressure brake, the combination with a brake pipe, of a brake controlling valve device comprising a main valve, an auxiliary valve having a movement relative to the main valve, a piston operated upon a reduction in brake pipe pressure for actuating said valves, means operative upon movement of the auxiliary valve relative to the main valve for venting fluid under pressure from the brake pipe, means adapted to cooperate with the main valve for yieldably opposing movement of the auxiliary valve relative to the main valve, means for loading the main valve at substantially the time the yieldable opposing means become effective to oppose movement of the auxiliary valve and for maintaining the main valve loaded while the valves are being moved to brake applying position and while they remain in brake applying position to prevent said yieldable opposing means from moving the main valve.

9. In a fluid pressure brake, the combination with a brake pipe, of a brake controlling valve device comprising a main valve, an auxiliary valve having a movement relative to the main valve, a piston operated upon a reduction in brake pipe pressure for actuating said valves to effect an application of the brakes, and operated upon an increase in brake pipe pressure for operating said valves to effect the release of the brakes, means operative upon movement of the auxiliary valve relative to the main valve in effecting an application of the brakes for venting fluid under pressure from the brake pipe, means for loading the main valve at substantially the time the yieldable opposing means become effective to oppose movement of the auxiliary valve and for maintaining the main valve loaded while the valves are being moved to and are in brake applying position to prevent said yieldable opposing means from moving the main valve, said main valve being relieved of the pressure of said yieldable opposing means upon movement of said piston from brake applying position, and means operative at substantially the time the main valve is relieved of the pressure of the yieldable opposing means for unloading the main valve.

10. In a fluid pressure brake, the combination with a brake pipe, of a brake controlling valve device comprising a main valve, an auxiliary valve having a movement relative to the main valve, a piston operated upon a reduction in brake pipe pressure for actuating said valves to effect an application of the brakes, and operated upon an increase in brake pipe pressure for operating said valves to effect the release of the brakes, means operative upon movement of the auxiliary valve relative to the main valve in effecting an application of the brakes for venting fluid under pressure from the brake pipe, means for loading the main valve at substantially the time the yieldable opposing means become effective to oppose movement of the auxiliary valve and for maintaining the main valve loaded while the valves are being moved to and are in brake applying position to prevent said yieldable opposing means from moving the main valve, said main valve being relieved of the pressure of said yieldable opposing means upon movement of said piston from brake applying position, and means operative at substantially the time the main valve is relieved of the pressure of the yieldable opposing means for unloading the main valve and for maintaining the valve unloaded during its travel to a release position.

11. A triple valve device comprising a piston, a main valve and an auxiliary valve having a release position, an application position and an application lap postion and operable to said positions by said piston, means operative to load the main valve in said application position, and means operative to unload the main valve in said lap position and for maintaining the main valve unloaded from lap position to said release position.

12. A triple valve device comprising a piston, a main valve and an auxiliary valve having a release position, a quick service position, an application position and an application lap position and operable to said positions by said piston, means operable to load the main valve in said quick service position and to maintain the valve loaded from quick service position to application position, and means operable to unload the main valve in lap position and to maintain the valve unloaded from lap to release position.

13. A triple valve device comprising a piston, a main valve and an auxiliary valve having an application position and an application lap position and operable to said positions by said piston, means operative to load the main valve when said valves are in application position and means operable to unload the main valve upon the shifting of the auxiliary valve to lap position.

14. In a fluid pressure brake, the combination with a brake pipe and a brake cylinder, of a brake controlling valve device operative upon a reduction in brake pipe pressure to locally vent fluid under pressure from the brake pipe directly to the atmosphere and to supply fluid under pressure to the brake cylinder to effect an application of the brakes, a valve operative to cut off the local flow of fluid from the brake pipe to the atmosphere, and means subject to the opposing pressures of the brake cylinder and a spring and operated according to a predetermined brake cylinder pressure for closing off the local flow of fluid from the brake pipe to the atmosphere.

15. In a fluid pressure brake, the combination with a brake pipe and a brake cylinder, of a brake controlling valve device operative upon a reduction in brake pipe pressure to establish a communication through which fluid under pressure is supplied to the brake cylinder to effect an application of the brakes and to establish communication through which fluid under pressure is locally vented from the brake pipe directly to the atmosphere, a valve operative to cut off the local flow of fluid from the brake pipe to the atmosphere, and means subject to the opposing pressure of the brake cylinder and a spring and operative according to a predetermined increase in brake cylinder pressure to limit the amount of fluid locally vented from the brake pipe.

16. In a fluid pressure brake, the combination with a brake pipe, a brake cylinder, and a brake controlling valve device operative upon a reduction in brake pipe pressure to locally vent fluid under pressure from the brake pipe directly to the atmosphere and to supply fluid under pressure to the brake cylinder to effect an application of the brakes, of a valve device operative to close off the flow of fluid from the brake pipe to the atmosphere, said valve device comprising a casing having a passage through which fluid locally vented from the brake pipe is adapted to flow to the atmosphere, a valve in said casing operative to close off the local flow of fluid from the brake pipe to said passage, a flexible diaphragm operative upon an increase in brake cylinder pressure for actuating said valve, and a restriction in said passage for preventing the rapid loss of fluid from the brake cylinder in the event of the rupture of said diaphragm.

17. In a fluid pressure brake, the combination with a brake pipe and a brake cylinder, of a brake controlling valve device operative upon a reduction in brake pipe pressure to locally vent fluid under pressure from the brake pipe directly to the atmosphere and to supply fluid under pressure to the brake cylinder to effect an application of the brakes, a choke for restricting the rate of the local flow of fluid from the brake pipe to the atmosphere, and means operated by fluid at brake cylinder pressure for closing the communication through which fluid under pressure is vented from the brake pipe to the atmosphere to limit the amount of fluid vented from the brake pipe.

18. In a fluid pressure brake, the combination with a brake pipe, of a brake controlling valve device comprising a main valve, an auxiliary valve having a movement relative to the main valve for locally venting fluid under pressure from the brake pipe, a piston operated upon a reduction in brake pipe pressure for actuating said valves to brake applying position, means adapted to cooperate with the main valve for yieldably resisting movement of the auxiliary valve relative to the main valve, and means for loading the main valve to prevent movement of the main valve by the action of the first mentioned means.

19. In a fluid pressure brake, the combination with a brake pipe, of a brake controlling valve device comprising a main valve, an auxiliary valve having a movement relative to the main valve for locally venting fluid under pressure from the brake pipe, a piston operated upon a reduction in brake pipe pressure for actuating said valves to brake applying position, means adapted to cooperate with the main valve for yieldably resisting movement of the auxiliary valve relative to the main valve, and means for loading the main valve to prevent forward movement of the main valve beyond application position by the action of the first mentioned means.

CLAUDE A. NELSON.